(12) United States Patent
Zhao et al.

(10) Patent No.: US 11,600,084 B2
(45) Date of Patent: Mar. 7, 2023

(54) METHOD AND APPARATUS FOR DETECTING AND INTERPRETING PRICE LABEL TEXT

(71) Applicant: Symbol Technologies, LLC, Holtsville, NY (US)

(72) Inventors: Mingxi Zhao, Shanghai (CN); Yan Zhang, Buffalo Grove, IL (US); Kevin J. O'Connell, Palatine, IL (US); Zhi-Gang Fan, Shanghai (CN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/610,852

(22) PCT Filed: May 5, 2017

(86) PCT No.: PCT/CN2017/083143
§ 371 (c)(1),
(2) Date: Nov. 4, 2019

(87) PCT Pub. No.: WO2018/201423
PCT Pub. Date: Nov. 8, 2018

(65) Prior Publication Data
US 2021/0142092 A1    May 13, 2021

(51) Int. Cl.
*G06V 20/62* (2022.01)
*G06K 7/14* (2006.01)
(Continued)

(52) U.S. Cl.
CPC .......... *G06V 20/63* (2022.01); *G06K 7/1447* (2013.01); *G06K 9/6215* (2013.01); *G06Q 30/02* (2013.01);
(Continued)

(58) Field of Classification Search
CPC .... G06K 9/3258; G06K 9/342; G06K 9/4642; G06K 7/1447; G06K 9/6215;
(Continued)

(56) References Cited

U.S. PATENT DOCUMENTS 5,209,712 A    5/1993 Ferri
5,214,615 A    5/1993 Bauer
(Continued)

FOREIGN PATENT DOCUMENTS

CA    2835830    11/2012
CA    3028156    1/2018
(Continued)

OTHER PUBLICATIONS

International Search Report and Written Opinion for International Application No. PCT/CN2017/083143 dated Feb. 11, 2018.
(Continued)

*Primary Examiner* — Ping Y Hsieh
*Assistant Examiner* — Daniella M. DiGuglielmo

(57) ABSTRACT

A method of price text detection by an imaging controller comprises obtaining, by the imaging controller, an image of a shelf supporting labels bearing price text, generating, by the imaging controller, a plurality of text regions containing candidate text elements from the image, assigning, by the imaging controller, a classification to each of the text regions, selected from a price text classification and a non-price text classification. The imaging controller, within each of a subset of the text regions having the price text classification: detects a price text sub-region and generates a price text string by applying character recognition to the price text sub-region. The method further includes presenting, by the imaging controller, the locations of the subset of text regions, in association with the corresponding price text strings.

18 Claims, 10 Drawing Sheets

(51) Int. Cl.
  *G06K 9/62* (2022.01)
  *G06Q 30/02* (2012.01)
  *G06V 10/50* (2022.01)
  *G06V 10/26* (2022.01)
  *G06V 30/18* (2022.01)
  *G06V 30/10* (2022.01)
  *G06V 30/148* (2022.01)

(52) U.S. Cl.
  CPC ............ *G06V 10/267* (2022.01); *G06V 10/50* (2022.01); *G06V 30/15* (2022.01); *G06V 30/18086* (2022.01); *G06V 30/10* (2022.01); *G06V 30/18124* (2022.01)

(58) Field of Classification Search
  CPC .. G06K 2209/01; G06K 9/4661; G06Q 30/02; G06V 20/63; G06V 10/267; G06V 10/50; G06V 30/10; G06V 30/15; G06V 30/18086; G06V 30/18124
  USPC .......................................................... 382/159
  See application file for complete search history.

(56) References Cited

U.S. PATENT DOCUMENTS

| | | |
|---|---|---|
| 5,408,322 A | 4/1995 | Hsu et al. |
| 5,414,268 A | 5/1995 | McGee |
| 5,423,617 A | 6/1995 | Marsh et al. |
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,133,951 B1 * | 11/2018 | Mendonca ........... G06K 9/4642 |
| 10,197,400 B2 | 2/2019 | Jesudason et al. |
| 10,210,603 B2 | 2/2019 | Venable et al. |

(56) References Cited

U.S. PATENT DOCUMENTS

| | | |
|---|---|---|
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0064286 A1 | 3/2006 | Fink et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1* | 8/2011 | Filimonova ............ G06K 9/46 382/195 |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | VolKmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2013/0342363 A1 | 12/2013 | Paek et al. |

(56) References Cited

U.S. PATENT DOCUMENTS

| | | |
|---|---|---|
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195095 A1 | 7/2014 | Flohr et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052029 A1 | 2/2015 | Wu et al. |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0353280 A1 | 12/2015 | Brazeau et al. |
| 2015/0355639 A1 | 12/2015 | Versteeg et al. |
| 2015/0363625 A1* | 12/2015 | Wu .................... G06K 9/00664 382/203 |
| 2015/0363758 A1* | 12/2015 | Wu ...................... G06V 30/414 705/20 |
| 2015/0365660 A1 | 12/2015 | Wu et al. |
| 2015/0379704 A1 | 12/2015 | Chandrasekar et al. |
| 2016/0026253 A1 | 1/2016 | Bradski et al. |
| 2016/0042223 A1 | 2/2016 | Suh et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1* | 6/2016 | Schwartz ............. G06K 9/6267 382/180 |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0259329 A1 | 9/2016 | High et al. |
| 2016/0260051 A1* | 9/2016 | Wu .......................... G06T 11/60 |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1* | 2/2017 | Rizzolo .................. G06V 20/10 |
| 2017/0041553 A1 | 2/2017 | Cao et al. |
| 2017/0054965 A1 | 2/2017 | Raab et al. |
| 2017/0066459 A1 | 3/2017 | Singh |
| 2017/0074659 A1 | 3/2017 | Giurgiu et al. |
| 2017/0083774 A1 | 3/2017 | Solar et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0178060 A1 | 6/2017 | Schwartz |
| 2017/0178227 A1 | 6/2017 | Gornish |
| 2017/0178310 A1 | 6/2017 | Gornish |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0297478 A1 | 10/2017 | Sherman et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0101813 A1 | 4/2018 | Paat et al. |
| 2018/0108120 A1 | 4/2018 | Venable et al. |
| 2018/0108134 A1 | 4/2018 | Venable et al. |
| 2018/0114183 A1 | 4/2018 | Howell |
| 2018/0129201 A1 | 5/2018 | Douglas et al. |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0197139 A1 | 7/2018 | Hill |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |

(56) References Cited

U.S. PATENT DOCUMENTS

| | | |
|---|---|---|
| 2018/0276596 A1 | 9/2018 | Murthy et al. |
| 2018/0281191 A1 | 10/2018 | Sinyayskiy et al. |
| 2018/0293442 A1 | 10/2018 | Fridental et al. |
| 2018/0293543 A1 | 10/2018 | Tiwari |
| 2018/0306958 A1 | 10/2018 | Goss et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2018/0321692 A1 | 11/2018 | Castillo-Effen et al. |
| 2018/0370727 A1 | 12/2018 | Hance et al. |
| 2019/0049962 A1 | 2/2019 | Ouellette et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0073559 A1 | 3/2019 | Rzeszutek et al. |
| 2019/0073627 A1 | 3/2019 | Nakdimon et al. |
| 2019/0077015 A1 | 3/2019 | Shibasaki et al. |
| 2019/0087663 A1 | 3/2019 | Yamazaki et al. |
| 2019/0094876 A1 | 3/2019 | Moore et al. |
| 2019/0108606 A1 | 4/2019 | Komiyama |
| 2019/0160675 A1 | 5/2019 | Paschal, II et al. |
| 2019/0178436 A1 | 6/2019 | Mao et al. |
| 2019/0180150 A1 | 6/2019 | Taylor et al. |
| 2019/0197439 A1 | 6/2019 | Wang |
| 2019/0197728 A1 | 6/2019 | Yamao |
| 2019/0236530 A1 | 8/2019 | Cantrell et al. |
| 2019/0304132 A1 | 10/2019 | Yoda et al. |
| 2019/0392212 A1 | 12/2019 | Sawhney et al. |
| 2020/0053325 A1 | 2/2020 | Deyle et al. |
| 2020/0314333 A1 | 10/2020 | Liang et al. |

FOREIGN PATENT DOCUMENTS

| | | | |
|---|---|---|---|
| CN | 102214343 A | | 10/2011 |
| CN | 104200086 | | 12/2014 |
| CN | 105989512 A | | 10/2016 |
| CN | 107067382 | | 8/2017 |
| CN | 206952978 | | 2/2018 |
| EP | 766098 | | 4/1997 |
| EP | 1311993 | | 5/2007 |
| EP | 2309378 | | 4/2011 |
| EP | 2439487 | | 4/2012 |
| EP | 2472475 | | 7/2012 |
| EP | 2562688 | | 2/2013 |
| EP | 2662831 | | 11/2013 |
| EP | 2693362 | | 2/2014 |
| EP | 3400113 | | 11/2018 |
| GB | 2323238 | | 9/1998 |
| GB | 2330265 | | 4/1999 |
| JP | 2014170431 | | 9/2014 |
| JP | 2016194834 A | | 11/2016 |
| JP | 2016194834 A | * | 11/2016 |
| JP | 2017016539 A | | 1/2017 |
| KR | 1020190031431 | | 3/2019 |
| WO | WO 99/23600 | | 5/1999 |
| WO | WO 2003002935 | | 1/2003 |
| WO | WO 2003025805 | | 3/2003 |
| WO | WO 2006136958 | | 12/2006 |
| WO | WO 2007042251 | | 4/2007 |
| WO | WO 2008057504 | | 5/2008 |
| WO | WO 2008154611 | | 12/2008 |
| WO | WO 2012103199 | | 8/2012 |
| WO | WO 2012103202 | | 8/2012 |
| WO | WO 2012154801 | | 11/2012 |
| WO | WO 2013165674 | | 11/2013 |
| WO | WO 2014066422 | | 5/2014 |
| WO | WO 2014092552 | | 6/2014 |
| WO | WO 2014181323 | | 11/2014 |
| WO | WO 2015127503 | | 9/2015 |
| WO | WO 2016020038 | | 2/2016 |
| WO | WO 2017187106 | | 11/2017 |
| WO | WO 2018018007 | | 1/2018 |
| WO | WO 2018204308 | | 11/2018 |
| WO | WO 2018204342 | | 11/2018 |
| WO | WO 2019023249 | | 1/2019 |

OTHER PUBLICATIONS

Notice of allowance for U.S. Appl. No. 15/211,103 dated Apr. 5, 2017.

Olson, Clark F., etal. "Wide-Baseline Stereo Vision for terrain Mapping" in Machine Vision and Applications, Aug. 2010.

Oriolo et al., "An iterative learning controller for nonholonomic mobile Robots", the international Journal of Robotics Research, Aug. 1997, pp. 954-970.

Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-.

Park et al., "Autonomous mobile robot navigation using passive rfid in indoor environment," IEEE, Transactions on industrial electronics, vol. 56, issue 7, pp. 2366-2373 (Jul. 2009).

Perveen et al. (An overview of template matching methodologies and its application, International Journal of Research in Computer and Communication Technology, v2n10, Oct. 2013) (Year: 2013).

Pivtoraiko et al., "Differentially constrained mobile robot motion planning in state lattices", journal of field robotics, vol. 26, No. 3, 2009, pp. 308-333.

Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.

Puwein, J., et al."Robust Multi-view camera calibration for wide-baseline camera networks," in IEEE Workshop on Applications of computer vision (WACV), Jan. 2011.

Rusu, et al. "How to incrementally register pairs of clouds," PCL Library, retrieved from internet on Aug. 22, 2016 [http://pointclouds.org/documentation/tutorials/pairwise_incremental_registration.php.

Rusu, et al. "Spatial Change detection on unorganized point cloud data," PCL Library, retrieved from internet on Aug. 19, 2016 [http://pointclouds.org/documentation/tutorials/octree_change.php].

Schnabel et al. "Efficient RANSAC for Point-Cloud Shape Detection", vol. 0, No. 0, pp. 1-12 (1981).

Senthilkumaran, et al., "Edge Detection Techniques for Image Segmentation—A Survey of Soft Computing Approaches", International Journal of Recent Trends in Engineering, vol. 1, No. 2 (May 2009).

Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].

Tahir, Rabbani, et al., "Segmentation of point clouds using smoothness constraint," International Archives of Photogrammetry, Remote Sensing and Spatial Information Sciences 36.5 (Sep. 2006): 248-253.

Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.

Tseng, et al., "A Cloud Removal Approach for Aerial Image Visualization", International Journal of Innovative Computing, Information & Control, vol. 9, No. 6, pp. 2421-2440 (Jun. 2013).

Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).

United Kingdom Intellectual Property Office, "Combined Search and Examination Report" for GB Patent Application No. 1813580.6 dated Feb. 21, 2019.

United Kingdom Intellectual Property Office, Combined Search and Examination Report dated Jan. 22, 2016 for GB Patent Application No. 1417218.3.

(56) References Cited

OTHER PUBLICATIONS

United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Dubois, M., et al., A comparison of geometric and energy-based point cloud semantic segmentation methods, European Conference on Mobile Robots (ECMR), p. 88-93, Sep. 25-27, 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/049761 dated Nov. 15, 2019.
International Search Report and Written Opinion from International Patent Application No. PCT/US2019/051312 dated Nov. 15, 2019.
International Search Report and Written Opinion from International Patent Application No. PCT/US2019/054103 dated Jan. 6, 2020.
International Search Report and Written Opinion from International Patent Application No. PCT/US2019/064020 dated Feb. 19, 2020.
International Search Report and Written Opinion for International Patent Application No. PCT/US2020/027948 dated Jul. 16, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.
International Search Report and Written Opinion from International Patent Application No. PCT/US2020/035285 dated Aug. 27, 2020.
International Search Report and Written Opinion for International Patent Application No. PCT/US2021/024805 dated Aug. 2, 2021.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).

(56) References Cited

OTHER PUBLICATIONS

Marder-Eppstein et al., "The Office Marathon: robust navigation in an indoor office environment," IEEE, 2010 International conference on robotics and automation, May 3-7, 2010, pp. 300-307.

McNaughton, Matthew, et al. "Motion planning for autonomous driving with a conformal spatiotemporal lattice." Robotics and Automation (ICRA), 2011 IEEE International Conference on. IEEE, 2011. (Year: 2011).

Meyersohn, "Walmart turns to robots and apps in stores", https://www.cnn.com/2018/12/07/business/walmart-robot-janitors-dotcom-store/index.html, Oct. 29, 2019.

Mitra et al., "Estimating surface normals in noisy point cloud data," International Journal of Computational geometry & applications, Jun. 8-10, 2003, pp. 322-328.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Ni et al., "Edge Detection and Feature Line Tracing in 3D-Point Clouds by Analyzing Geometric Properties of Neighborhoods," Remote Sensing, V8 I9, pp. 1-20 (2016).

Norriof et al., "Experimental comparison of some classical iterative learning control algorithms", IEEE Transactions on Robotics and Automation, Jun. 2002, pp. 636-641.

Notice of allowance for U.S. Appl. No. 13/568,175 dated Sep. 23, 2014.

Notice of allowance for U.S. Appl. No. 13/693,503 dated Mar. 11, 2016.

Notice of allowance for U.S. Appl. No. 14/068,495 dated Apr. 25, 2016.

Notice of allowance for U.S. Appl. No. 14/518,091 dated Apr. 12, 2017.

"Fair Billing with Automatic Dimensioning" pp. 1-4, undated, Copyright Mettler-Toledo International Inc.

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Faade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Castorena et al., "Autocalibration of lidar and optical cameras via edge alignment", 2016 IEEE International Conference on Acoustics, Speech and Signal Processing (Mar. 20, 2016).

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France, [hal-01097361].

Douillard, Bertrand, et al. "On the segmentation of 3D LIDAR point clouds." Robotics and Automation (ICRA), 2011 IEEE International Conference on IEEE, 2011.

\* cited by examiner

METHOD AND APPARATUS FOR DETECTING AND INTERPRETING PRICE LABEL TEXT

CROSS-REFERENCE TO RELATED APPLICATIONS

This application is related to U.S. patent application Ser. No. 15/583,801, entitled "METHOD AND APPARATUS FOR EXTRACTING AND PROCESSING PRICE TEXT FROM AN IMAGE SET" by Zhang et al. and Ser. No. 15/583,786, entitled "METHOD AND APPARATUS FOR LABEL DETECTION" by Lam, as well as U.S. Provisional Patent Application No. 62/492,670, entitled "PRODUCT STATUS DETECTION SYSTEM" by Perrella et al., all having the filing date of May 1, 2017. The contents of the above-reference applications are incorporated herein by reference in their entirety.

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 8-10A depict the processing of a text region during the performance of block 325 of the method of FIG. 3.

Figure 1:
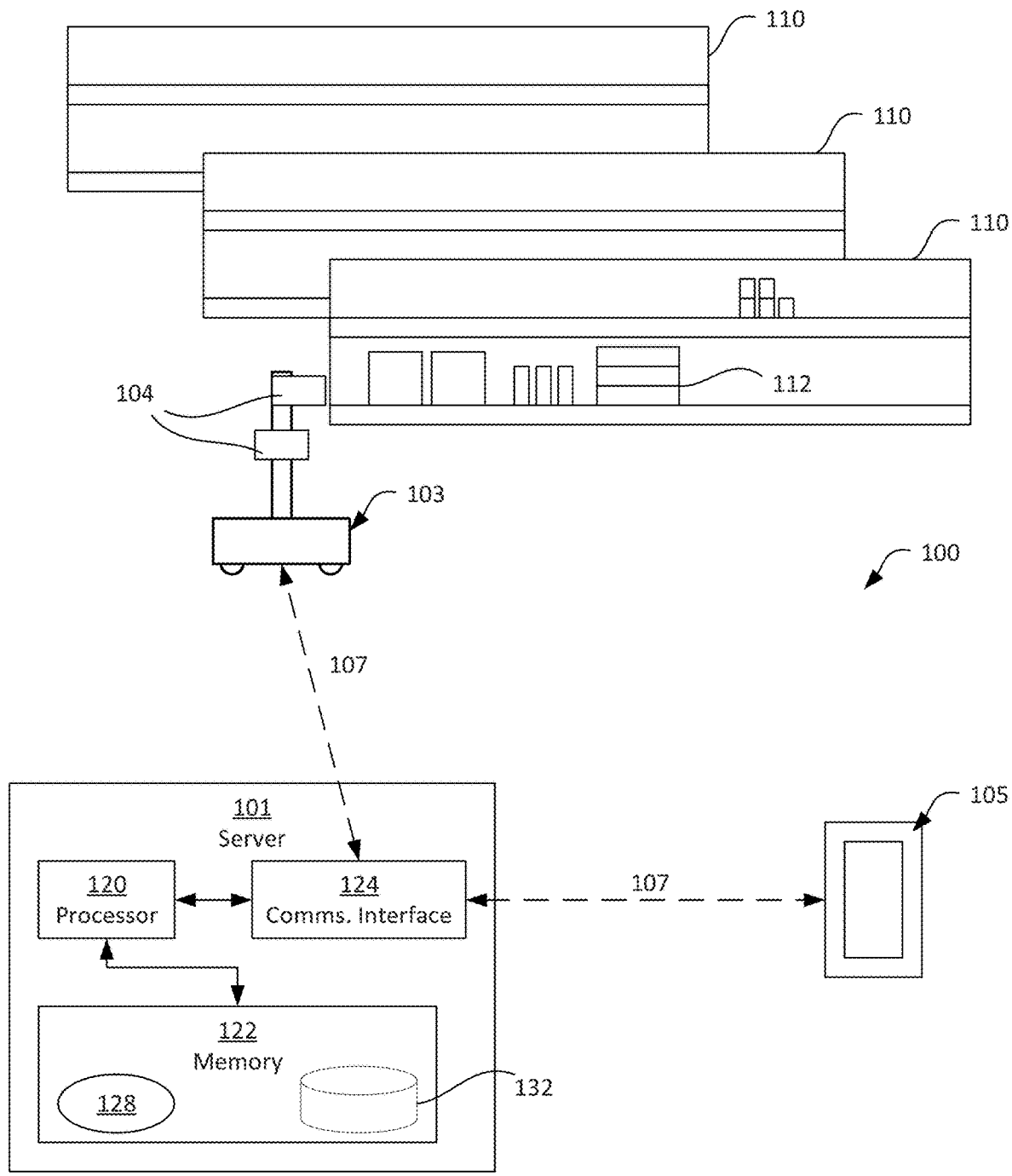
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Environments such as warehouses, retail locations (e.g. grocery stores) and the like typically contain a wide variety of products supported on shelves, for selection and purchase by customers. The products are generally labelled—for example, via a label placed on a shelf edge, or directly on the product itself—with information such as the price of the product, an identifier such as a SKU number, and the like. Such environments typically also store reference data relating to the products, for example in a central database, which is consulted by point-of-sale terminals during customer checkout to retrieve price information for the products being purchased. In some cases, the price physically labelled on or near the product on the shelves may not match the price stored in the above-mentioned database, leading to a conflict between the label price and the reference price at the point-of-sale terminal.

Mismatches between label and reference prices may require corrective action at one or both of the label and the central database. However, detecting such mismatches in order to allow corrective action to be taken is conventionally performed by human employees, via visual assessment of the shelves and manual barcode scanning. This form of detection is labor-intensive and therefore costly, as well as error-prone.

Attempts to automate the detection of such mismatches require the detection of the labelled price before an assessment may be conducted as to whether the label price matches the reference price. Various factors impede the accurate autonomous detection and interpretation of labelled prices, however. For example, in a retail environment in which a wide variety of products are arranged on shelves, many of the products themselves bear text (such as brand names, product names, ingredient lists and so on) that does not represent the price of the product. Further, the characters or text that do indicate the price of a product may be displayed in close proximity to other text on a label, rendering the detection and correct interpretation of the price by machine vision techniques difficult.

Examples disclosed herein are directed to a method of price text detection, comprising: obtaining an image of a shelf supporting labels bearing price text; generating a plurality of text regions containing candidate text elements from the image; assigning a classification to each of the text regions, selected from a price text classification and a non-price text classification; within each of a subset of the text regions having the price text classification: detecting a price text sub-region; and generating a price text string by applying character recognition to the price text sub-region; and presenting the locations of the subset of text regions, in association with the corresponding price text strings.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of shelf modules 110 each supporting a plurality of products 112. The shelf modules 110 are typically arranged in a plurality of aisles, each of which includes a plurality of modules aligned end-to-end. More specifically, the apparatus 103 is deployed within the retail environment, and communicates with the server 101 (via the link 107) to at least partially autonomously navigate the length of at least a portion of the shelves 110. The apparatus 103 is equipped with a plurality of navigation and data capture sensors 104, such as image sensors (e.g. one or more digital cameras) and depth sensors (e.g. one or more lidar sensors), and is further configured to employ the sensors to capture shelf data. In the present example, the apparatus 103 is configured to capture a series of digital images of the shelves 110, as well as a series of depth measurements, each describing the distance and direction between the apparatus 103 and one or more points on a shelf 110.

The server 101 includes a special purpose imaging controller, such as a processor 120, specifically designed to control the mobile automation apparatus 103 to capture data, obtain the captured data via the communications interface 124 and store the captured data in a repository 132 in the memory 122. The server 101 is further configured to perform various post-processing operations on the captured data and to detect the status of the products 112 on the shelves 110. When certain status indicators are detected by the imaging processor 120, the server 101 is also configured to transmit status notifications (e.g. notifications indicating that products are out-of-stock, low stock or misplaced) to the mobile device 105. The processor 120 is interconnected with a non-transitory computer readable storage medium, such as a memory 122, having stored thereon computer readable instructions for executing price text detection and interpretation, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the price text detection and interpretation discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103.

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more ASICs) rather than by execution of the control application 128 by the processor 120.

In the present example, in particular, the server 101 is configured via the execution of the control application 128 by the processor 120, to process image and depth data captured by the apparatus 103 to identify portions of the captured data depicting price labels, and to detect and interpret the text indicative of product prices on such labels.

Figure 2:
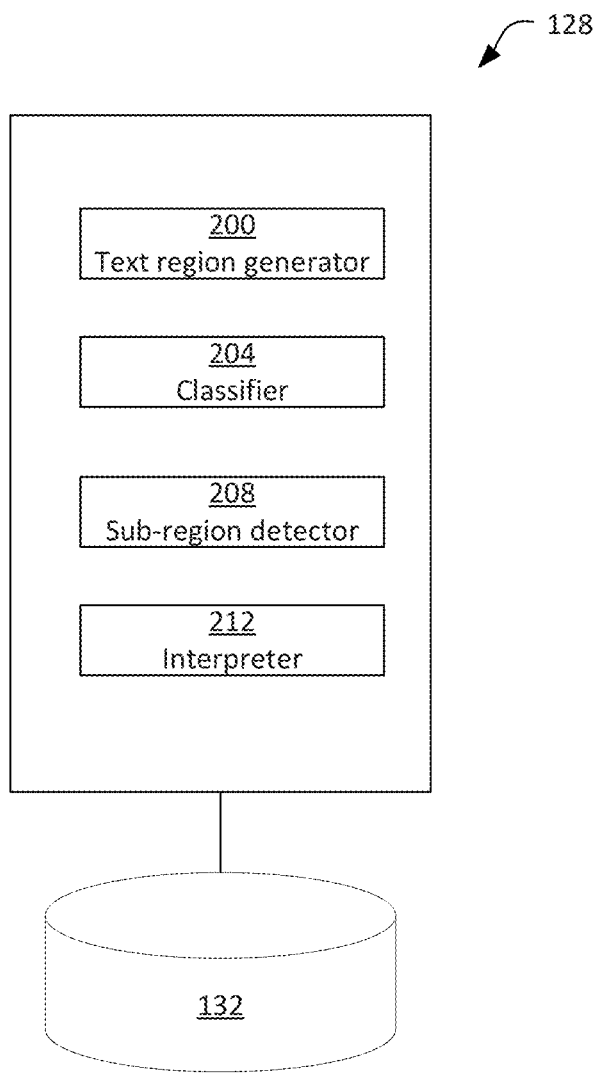
FIG. 2 is a block diagram of certain internal hardware components of the server in the system of FIG. 1.

Turning now to FIG. 2, before describing the operation of the application 128 to identify and interpret price text from captured image data, certain components of the application 128 will be described in greater detail. As will be apparent to those skilled in the art, in other examples the components of the application 128 may be separated into distinct applications, or combined into other sets of components. Some or all of the components illustrated in FIG. 2 may also be implemented as dedicated hardware components, such as one or more Application-Specific Integrated Circuits (ASICs) or FPGAs. For example, in one embodiment, to improve reliability and processing speed, at least some of the components of FIG. 2 are programmed directly into the imaging controller 120, which may be an FPGA or an ASIC having circuit and memory configuration specifically designed to optimize image processing and detection of high volume price label image data being received from the mobile automation apparatus 103. In such an embodiment, some or all of the control application 128, discussed below, is an FPGA or an ASIC chip.

The control application 128, in brief, includes components configured to identify text within a shelf image that is likely to represent a label price, and to interpret (i.e. recognize the characters in, or "read") that text. The control application 128 includes a text region generator 200 (also referred to herein simply as a region generator 200) and a classifier 204 that are configured to detect text regions in the image that are likely to correspond to price text labels (since the image may contain a multitude of text regions that are not prices). The control application 128 also includes a sub-region detector 208 configured, for the regions that are considered likely to be price text labels as identified by the region generator 200 and the classifier 204, to detect price text sub-regions within the text regions. The price text sub-regions are specific areas identified as containing price text characters rather than other characters also printed on a price label. The control application 128 also includes an interpreter 212 configured to interpret the text within the above-mentioned sub-regions, in order to generate a machine-readable representation of the price text printed on the physical label.

Figure 3:
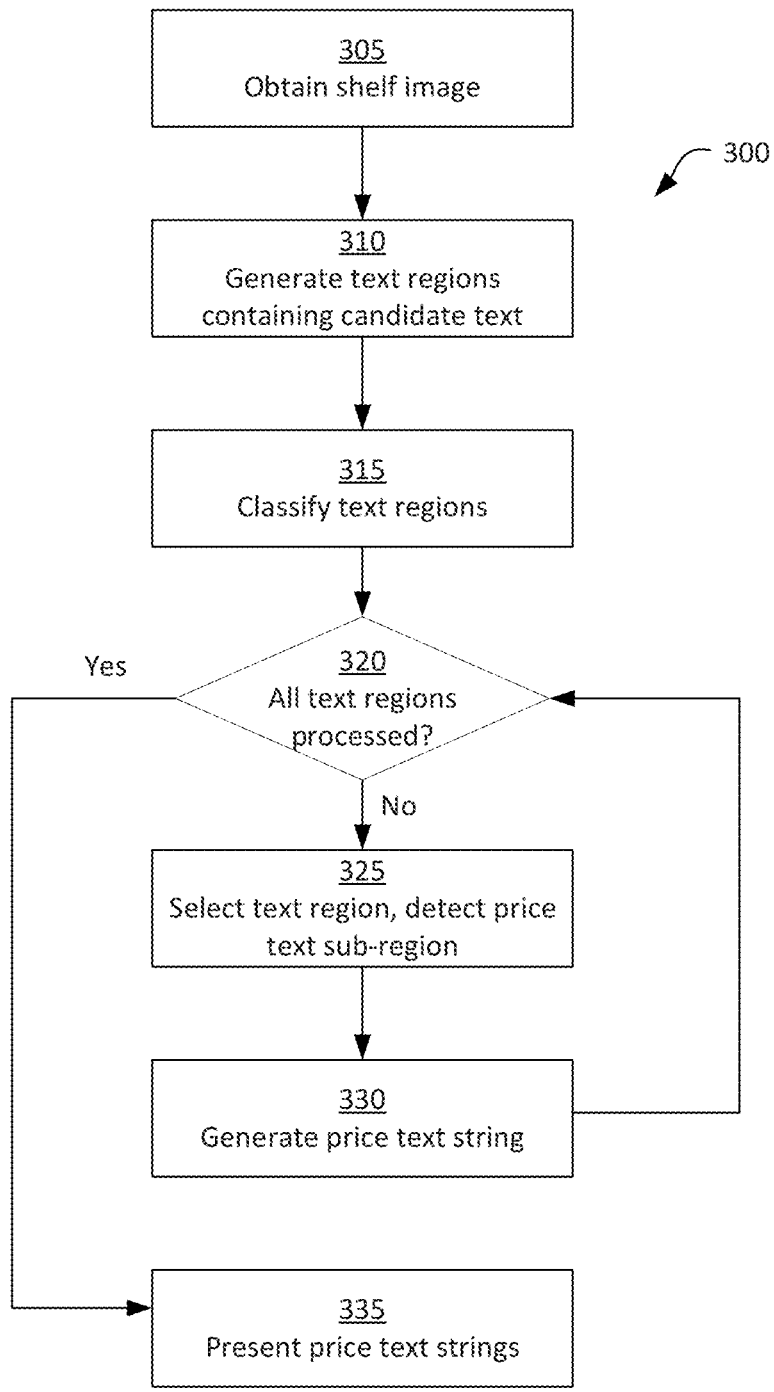
FIG. 3 is a flowchart of a method of price text detection and interpretation.

The functionality of the control application 128 will now be described in greater detail, with reference to the components illustrated in FIG. 2. Turning to FIG. 3, a method 300 of price text detection is shown. The method 300 will be described in conjunction with its performance on the system 100 as described above; however, it will be apparent to those skilled in the art that the method 300 may also be performed on other systems.

Figure 4:
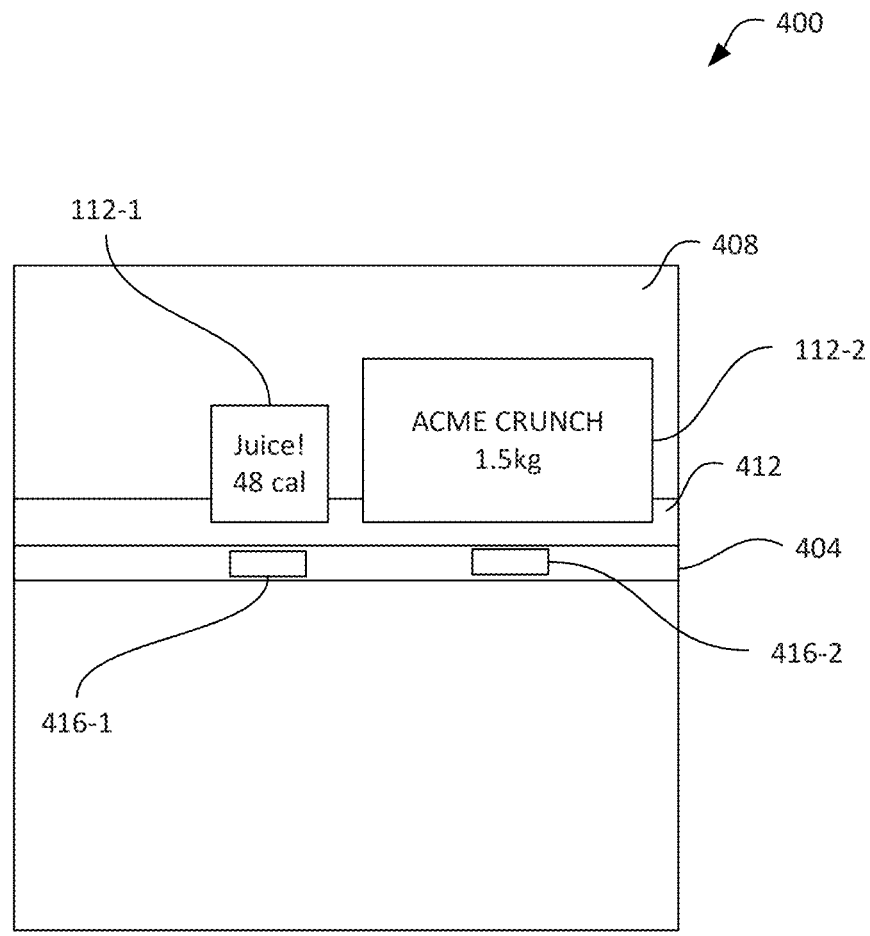
FIG. 4 is a shelf image employed as input to the method of FIG. 3.

The performance of the method 300 begins at block 305, at which the controller 120 is configured to obtain a digital image of the shelf 110, for example captured by the apparatus 103 and stored in the repository 132. An example image 400 is illustrated in FIG. 4, depicting a portion of a shelf 110. In particular, the image 400 depicts a shelf edge 404 and a shelf back 408, as well as a support surface 412 extending the between the shelf edge 404 and the shelf back 408 and supporting products 112-1 and 112-2. As seen in FIG. 4, the products 112 bear text such as the name or brand of a product, a weight, a calorie count, and the like. The image also depicts labels 416-1 and 416-2 (corresponding to the products 112-1 and 112-2, respectively), which in the present example are placed on the shelf edge 404, but may also be placed on the products 112 themselves or in their vicinity in other examples.

Figure 5A:
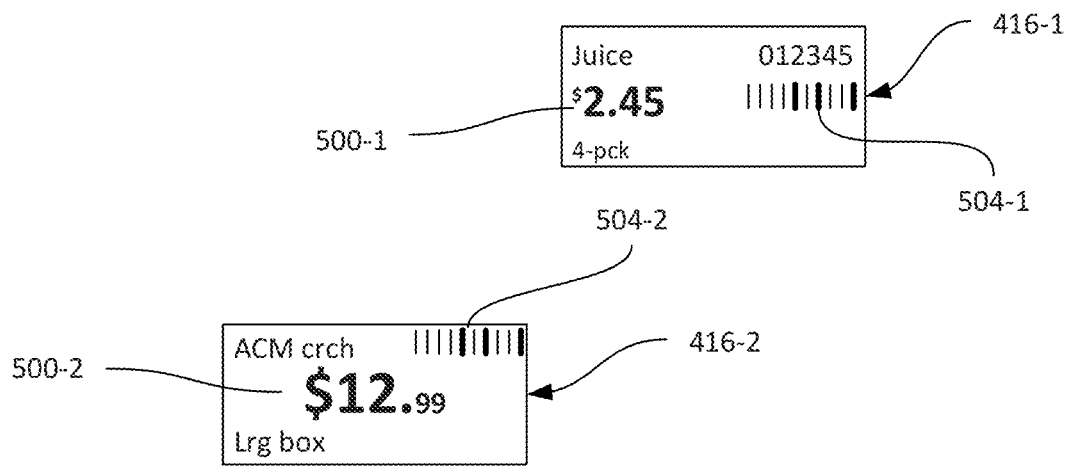
FIG. 5A illustrates example label formats processed in the method of FIG. 3.

The labels 416 include price text, and may also carry various other text. Turning to FIG. 5A, the labels 416 are shown in isolation. As is evident from the example label formats of FIG. 5A, the labels 416 bear a variety of text in addition to a price, and arrange the price and other text in different positions. For example, the labels 416-1 and 416-2 both include a price text element 500-1, 500-2. However, the price text 500-1 has a different font size for the price itself than for the currency symbol "$". Further, the price text 500-2 uses a larger font for a portion of the price (including the currency symbol) than the font size employed by the label 416-1, but a smaller font size for another portion of the price. Still further, both labels 416 include barcodes 504-1 and 504-2, but the locations of the barcodes 504 relative to the price text 500-1, 500-2 is different between the labels 416. In further examples, some or all labels may omit barcodes entirely. In addition, both labels 416 include additional non-price text elements, some of which are in close proximity to the price text 500, such as the string "ACM crch" above the price text 500-2. The examples in FIG. 5A are merely illustrative; as will be apparent to those skilled in the art, a wide variety of label formats exist and may therefore be depicted in any given shelf image. Variations among label formats include variations not only in text positioning and size as shown in FIG. 5A, but also in label shape, colors, and the like.

Returning to FIG. 3, at block 310 the region generator 200 is configured to generate a plurality of text regions containing candidate text elements from the image. In the present example, the region generator 200 is configured to apply a suitable blob detection operation to the image obtained at block 305. For example, the region generator 200 can apply a maximally stable extremal regions (MSER) operation on the image to identify elements in the image likely to be characters of text. As those of skill in the art will realize, a variety of blob detection operations are within the scope of the present disclosure.

Figure 5B:
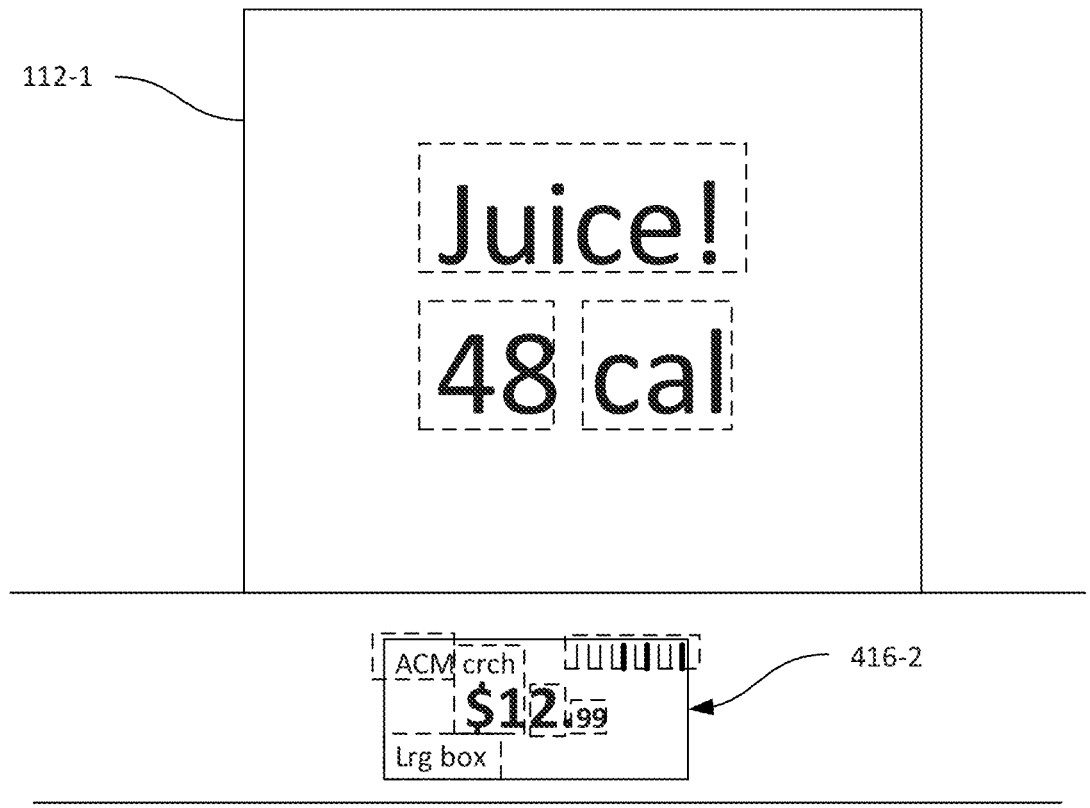
FIG. 5B depicts a portion of the image of FIG. 4 during the performance of block 310 of the method of FIG. 3.

Turning to FIG. 5B, a portion of the image 400 is shown with candidate text elements indicated in dashed lines, as identified by the region generator 200. As will be apparent, the exact nature of the candidate text elements identified by the region generator 200 depends on the specific blob detection operation performed and the configuration parameters employed for the blob detection operation. For example, while the strings "48" and "cal" are indicated as having been detected as distinct candidate text elements in FIG. 5B, in other examples the region generator 200 may identify the string "48 cal" as a single contiguous candidate text element. Also note that, in the illustrated example, the barcode of the label 416-2 is detected as a candidate text region.

The region generator 200 is further configured, in the present example, to refine the identification of text regions by grouping the candidate text elements. In particular, the region generator 200 is configured, for each pair of the candidate text elements, to determine whether a distance between the pair is below a predetermined distance threshold. The distance threshold may be preconfigured, for example as a number of pixels, a percentage of the width or height of the candidate text elements under consideration, or the like. When the distance between two candidate text elements is below the threshold, the region generator 200 is configured to generate a text region that encompasses both of the candidate text elements. When the distance between candidate text elements exceeds the threshold, the elements are not encompassed within a single text region. That is, the region generator 200 is configured to generate text regions specific to each of the candidate elements.

In the present example, the region generator 200 is configured to generate the text region as a rectangular region with dimensions selected to encompass the entirety of both candidate text elements. The above process is repeated for each pair of candidate text elements, or where a candidate text element has already been incorporated into a text region, between the text region and another candidate text element (or even between two text regions).

The region generator 200 is also configured, in some examples, to apply a size difference threshold to respective pairs of candidate text elements, text regions, or both. In other words, for each pair of candidate text elements the region generator 200 is configured to determine a size attribute (e.g. a height, width, area or the like) for the elements, and to determine whether a difference between the size attributes exceeds a preconfigured threshold (e.g. a percentage of the above-mentioned size attributes). When the difference between size attributes does not exceed the threshold, the candidate elements are not combined in a single text region. As above, the thresholding process is repeated until no further change is dictated in the extent of the text regions (that is, until the comparisons between text regions no longer result in the combination or extension of any of the text regions to encompass additional candidate text elements).

Figure 6:
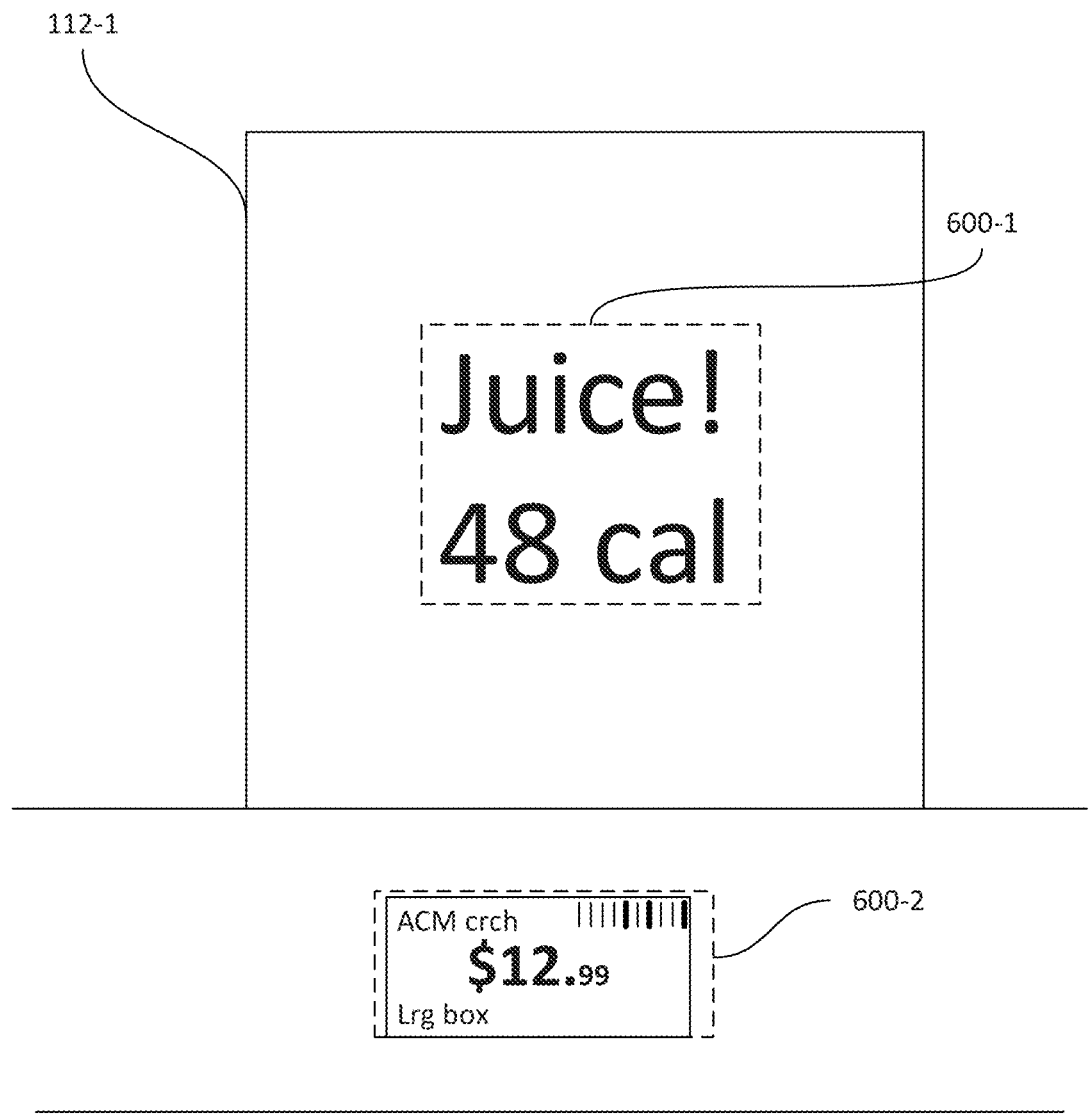
FIG. 6 depicts the image portion of FIG. 5B following the performance of block 310 of the method of FIG. 3.

The above-mentioned size and distance-based thresholds may also be combined by the region generator 200, in order to generate text regions encompassing candidate text elements that are sufficiently close to each other in both size and distance. In other examples, the region generator 200 applies only one or the other of the above-mentioned thresholds. In further examples, additional properties of the candidate text elements may also be considered, such as color. Referring to FIG. 6, the portion of the image 400 illustrated in FIG. 5B is shown again, following the application of size and distance-based thresholds. In particular, the candidate text elements shown in FIG. 5B are encompassed within two text regions 600-1 and 600-2.

Referring again to FIG. 3, at block 315 the classifier 204 is configured to assign a classification to each of the text regions 600, selected from a price text classification and a non-price text classification. In general, the classifier 204 is configured to distinguish between text regions likely to contain price text, and text regions that, although containing text, are not likely to contain price text. In the present example, the classifier 204 is configured to assign one of the above-mentioned classifications to the text regions 600 by generating a feature descriptor corresponding to each text region 600, providing the feature descriptor as an input to a trained classification engine, and receiving a classification as an output from the trained classification engine.

In the present example, the classifier 204 is configured to generate a feature descriptor for each text region 600 in the form of a combined feature vector generated from a histogram of oriented gradients (HOG) and a local binary pattern (LBP). In other examples, the feature descriptor is based on either the HOG or the local binary pattern. In further examples, as will be apparent to those skilled in the art, other suitable feature descriptors or combinations of feature descriptors can be employed.

Figure 7A:
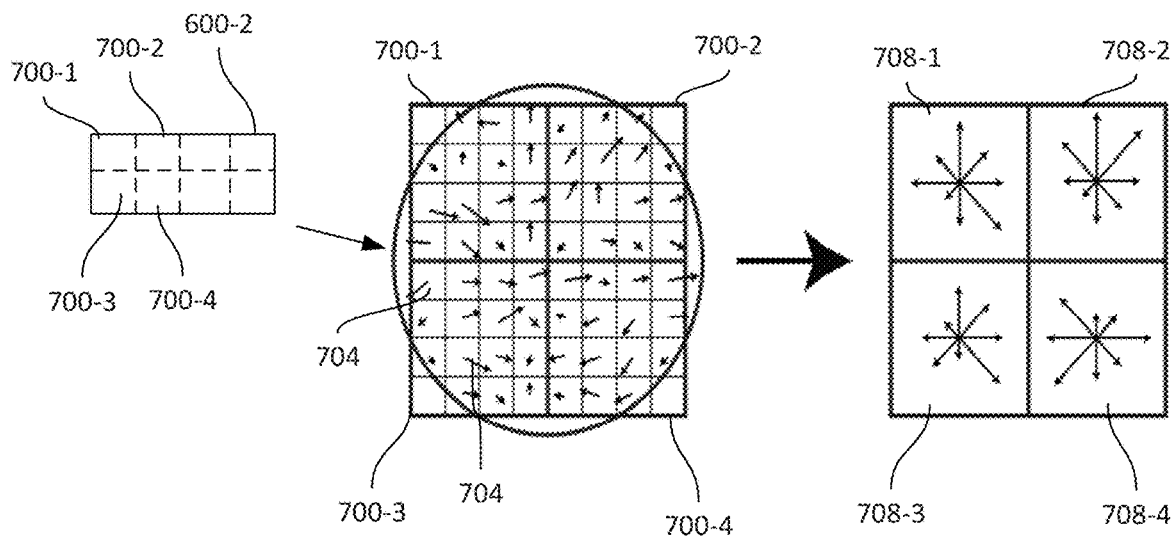
FIGS. 7A-7B illustrate the generation of feature descriptors during the performance of the method of FIG. 3.

To generate the above-mentioned HOG descriptor for a text region 600, the classifier 204 extracts each text region 600 from the image 400, and divides the extracted text region 600 into cells 700-1, 700-2, 700-3, 700-4 and so on, shown in FIG. 7A. The cells 700 can have predetermined dimensions (e.g. 4×4, 8×8 pixels or other suitable dimensions), or dimensions that vary based on the dimensions of the text regions 600 (for example, each text region 600 can be divided into four cells 700 of equal size). For each pixel of each cell 700, the classifier 204 then generates a gradient vector 704 indicating the angle of the greatest change in intensity between the pixel and its neighbors, as well as the magnitude of the change in intensity. Having obtained the above-mentioned vectors 704, the classifier 204 is configured to build a histogram, with bins corresponding to ranges of angles (e.g. 8 bins each accounting for an unsigned range of 20 degrees). The magnitude of each vector is added to the bin encompassing the vector's angle; in some example implementations, vectors with angles near the boundary between two adjacent bins may have their magnitudes divided between those bins. The resulting histogram for each cell is employed to construct a 1×N vector 708 (vectors 708-1, 708-2, 708-3, 708-4 are illustrated in FIG. 7A), where N is the number of histogram bins (8 in the present example, though other numbers of bins may also be employed), containing the magnitudes assigned to each of the bins. The classifier 204 is then configured to concatenate the feature vectors 708 of the cells 700 for each text region 600 into a single vector.

Figure 7B:
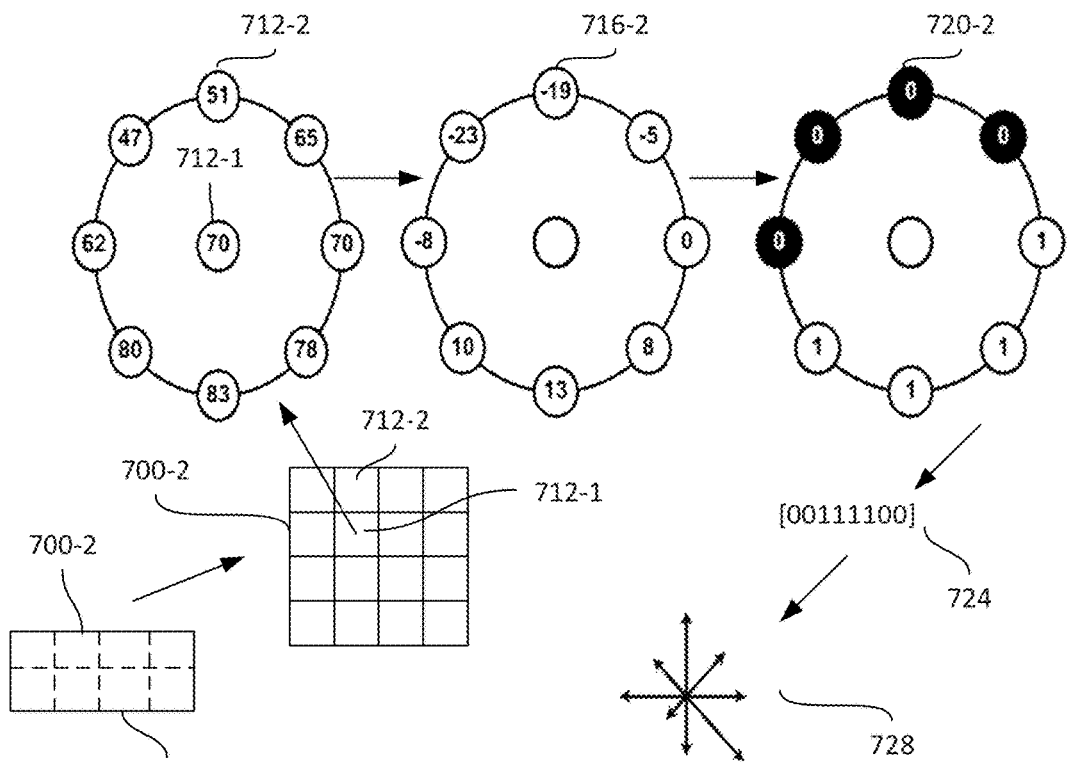

To generate the LBP descriptor for a text region 600, as illustrated in FIG. 7B, the classifier 204, as above, extracts each text region 600 from the image 400, and divides the extracted text region 600 into cells 700. For each pixel 712 (two pixels 712-1 and 712-2 are labelled for illustrative purposes in FIG. 7B) within each cell 700, the classifier 204 is then configured to traverse the eight neighbors of that pixel in a predetermined direction (typically clockwise or counter_clockwise). For each neighboring pixel, the classifier 204 is configured to determine a difference 716 between the intensities of the central pixel and the neighboring pixel (the difference 716-2 between the intensities of the pixels 712-1 and 712-2 is labelled in FIG. 7B). The classifier 204 is further configured to determine whether the above-mentioned difference 716 is greater or smaller than zero (i.e. whether the neighboring pixel 712 has a smaller or greater intensity than the central pixel 712). Binary values 720 (an example binary value 720-2 of which is labeled in FIG. 7B) are selected based on the above determination, and assembled into a feature vector 724 for the central pixel. Specifically, when the neighboring pixel 712 has a greater intensity than the central pixel, a "1" is appended to a feature vector 724 for the central pixel (otherwise, a "0" is appended to the feature vector 724). The result is, for each pixel, an eight-digit binary number, as seen in FIG. 7B. The classifier 204 is then configured to generate a histogram for the cell 700 based on the set of above-mentioned eight-digit numbers, in which the bins correspond to the positions of neighboring pixels in the above-mentioned clockwise or counter_clockwise traverses. The histogram indicates the frequency, within the cell, with which each of the eight neighboring positions has a greater intensity than the central pixel (e.g. the frequency of "1" values in the present example). The histogram is employed to construct a vector 728, and the vectors 728 for all cells are then concatenated to produce a feature descriptor for the text region 600.

The classifier 204 is further configured, in the present example, to combine the HOG and LBP descriptors, for example by concatenation. Following the generation of feature descriptors as discussed above, the classifier 204 is configured to assign a classification to each text region 600 based on the feature descriptors. The classification, as noted above, is one of price text classification and a non-price text classification, and may be assigned in a variety of ways.

In the present example, the classifier 204—specifically a preconfigured (i.e. trained) classification engine of the classifier 204—is configured to accept the above-mentioned feature descriptor as an input and to generate, as an output, a score for each text region 600. The score (for example, a percentage or a value between zero and one) indicates a level of confidence that the text region 600 represents a label containing price text. The classification engine can be a suitable classification engine, such as a neural network, support vector machine (SVM), or the like. The classification engine, as will be apparent to those skilled in the art, is trained prior to performance of the method 300. Training the classification engine is typically conducted by providing a plurality of ground truth examples (i.e. "correct" text regions that are known to contain price text) and a plurality of negative examples (i.e. "incorrect" text regions that are known not to contain price text). The classification engine is configured to construct model parameters allowing it to correctly identify price text-containing samples.

In some environments, as noted earlier, various label formats may be employed. The classification engine is trained, in such environments, to identify each label type separately. Therefore, in addition to a classification score, the output of the classifier 204 can include a label type identifier indicating the label format that best matches the text region 600. In other embodiments, classification may be performed by template matching or another suitable mechanism, rather than by a trained classification engine as discussed above.

The outcome of the performance of block 315 is a subset of the text regions 600 to which a price text classification was assigned at block 315. The subset of price text-classified text regions (region 600-2, in the example illustrated in FIG. 6) may be provided by the classifier 204 as, for example, rectangular bounding boxes associated with the above-mentioned scores.

At block 320, the control application is configured to determine whether all the price text-classified text regions have been processed. When the determination is negative, the performance of the method 300 proceeds to block 325. At block 325, the sub-region detector 208 is configured, for each of the subset of text regions 600 classified as containing price text, to detect a price text sub-region within the text region.

Figure 8:
Figure 8:
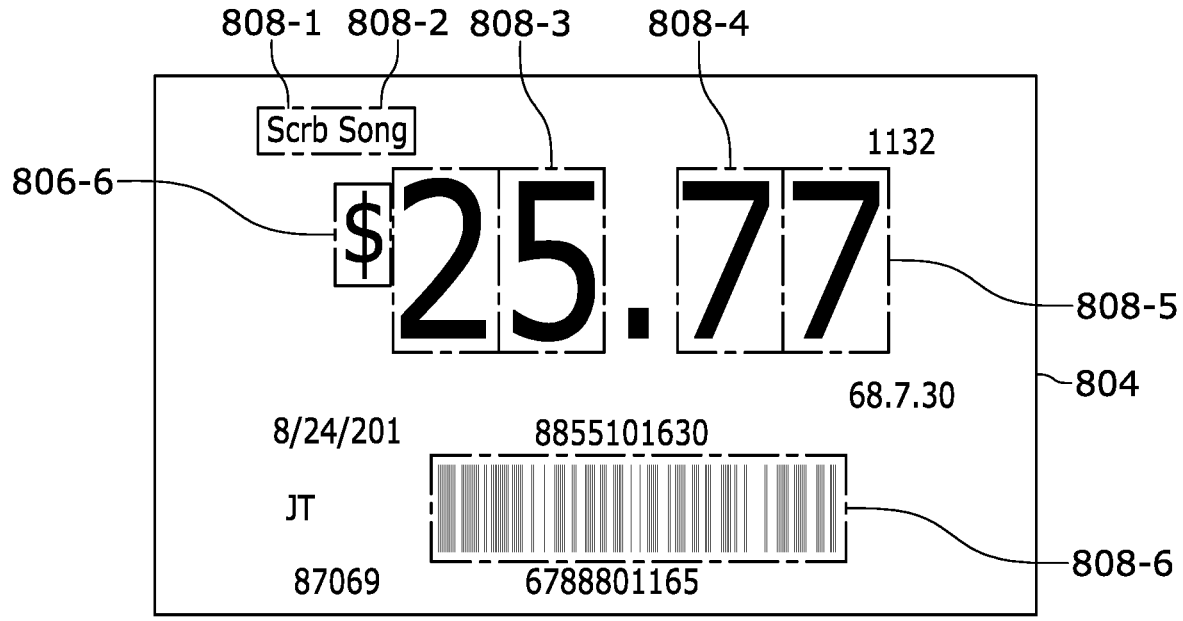

Turning to FIG. 8, the sub-region detector 208 is configured, in some examples, to begin the performance of block 320 by binarizing the extracted text region. FIG. 8 illustrates an example text region 800 extracted from a shelf image, in which the contrast ratio between the various text elements of the text region 800 is low. The sub-region detector 208 is therefore configured to generate a binarized version 804 of the text region 800 by applying any suitable binarization operation (e.g. an adaptive binarization operation). In other examples, binarization is omitted. In further examples, the sub-region detector 208 is configured to determine a contrast ratio for the text region under consideration (that is, the ratio of the intensity of the brightest pixel in the text region to the intensity of the least bright pixel in the text region). The sub-region detector 208 is then configured to apply binarization only when the contrast ratio fails to exceed a predetermined threshold.

Within the binarized text region 804 generated, the sub-region detector 208 is configured to group candidate text elements within the binarized text region 804 by size. In FIG. 8, a plurality of candidate text elements 808-1, 808-2, 808-3, 808-4, 808-5, 808-6 are illustrated (for example, as identified earlier at block 310) in dashed lines. In other embodiments, a distinct candidate text element operation may be performed at block 320, with parameters selected to increase the likelihood of individual characters of the price text being selected as distinct text elements.

Figure 9:
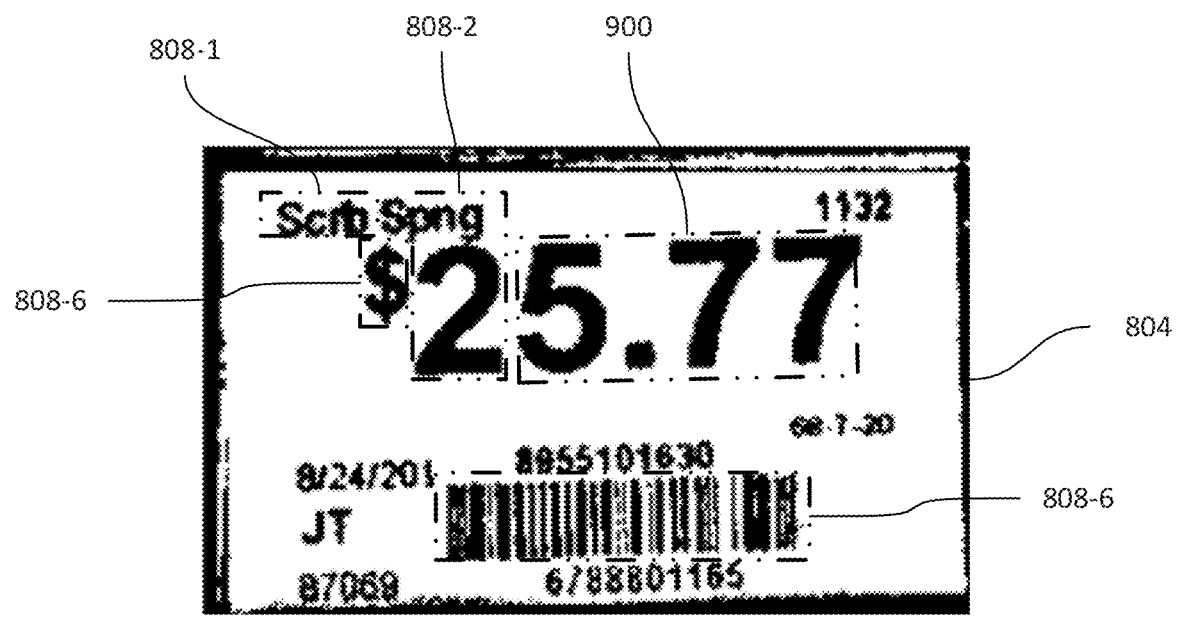

As seen in FIG. 8, the candidate text elements 808 have different dimensions. The sub-region detector 208 is configured to group the text elements 808 based on their dimensions; in particular, in the present example the sub-region generator is configured to group the text elements 808 by height (that is, the substantially vertical dimension as illustrated in FIG. 8). That is, the sub-region generator is configured to compare the height of each pair of text elements 808, and when the difference between the heights is below a predefined threshold, the sub-region detector 208 is configured to group the text elements 808 together. FIG. 9 illustrates the completion of the grouping process for the binarized text region 804. In particular, the three text elements 808-3, 808-4 and 808-5 have been grouped into a text group 900. The group 900 is defined, in the present example, as a rectangular bounding box dimensioned to encompass each of the candidate text elements 808-3, 808-4 and 808-5. Of particular note, the candidate text element 808-2 is greater in height than the elements of the group 900, because the character "2" and the characters "png" in the element 808-2 have been identified as a single candidate text element. Therefore, the element 808-2 has not been grouped with the group 900. The remaining elements 808 have also not been grouped, and are therefore considered independent groups.

Having grouped the text elements, the sub-region detector 208 is configured to select a primary one of the groups. In general, the selection of a primary group aims to select the group most likely to contain solely price text characters. In the present example, the primary group is selected based on a comparison of the two-dimensional area of the sub-regions. Thus, the area of the group 900 is compared with the respective areas of the remaining text elements 808 shown in FIG. 9 (which, for the present analysis, are considered to be groups). The sub-region detector 208 is configured to select the group with the greatest area as the primary sub-region. In the example of FIG. 9, the group 900 has a greater area than the other sub-regions, and is therefore selected as the primary group.

Figure 10A:
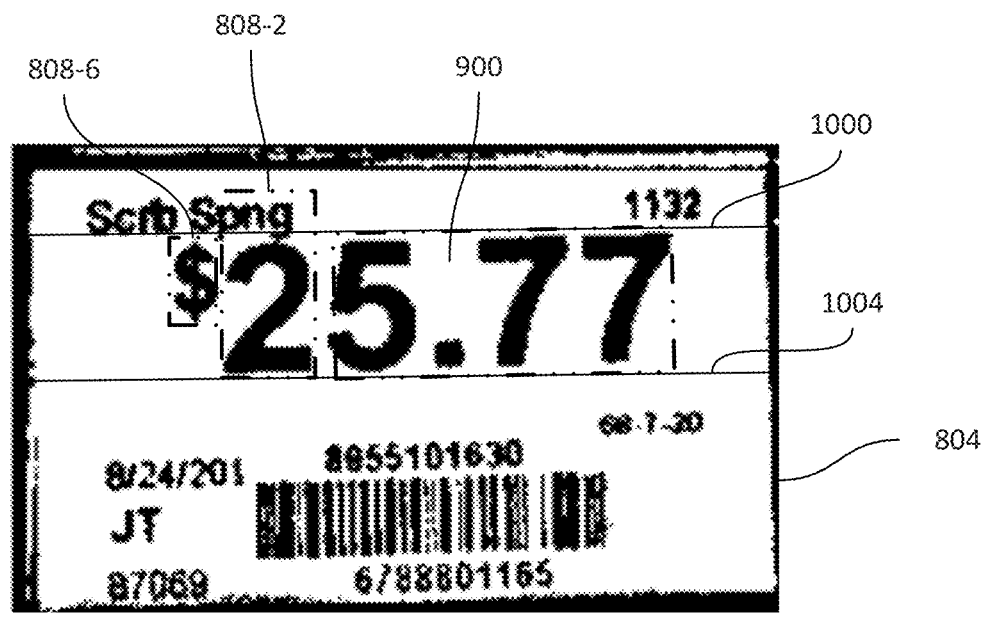

Following the selection of a primary group, the sub-region detector 208 is configured to fit upper and lower boundary lines to the primary group. Turning to FIG. 10A, upper and lower boundary lines 1000 and 1004, respectively, are illustrated. The sub-region detector 208 is configured to fit the boundary lines 1000 and 1004 by determining a position and slope of the upper and lower edges of the rectangular bounding box of the primary group 900, and generating lines having the same positions and slopes, and extending the entire width of the text region 804.

Figure 10B:
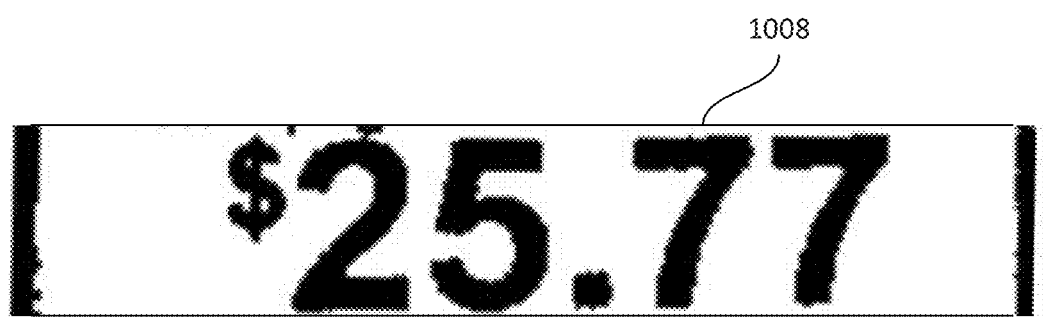
FIG. 10B is a price text sub-region detected during the performance of the method of FIG. 3.

Having fitted the boundary lines 1000 and 1004 to the primary group 900, the sub-region detector 208 is then configured to extend the bounding box of the primary group 900 along the upper and lower boundary lines to define the price text sub-region. As a result, the sub-region detector 208 generates a price text sub-region 1008 as shown in isolation in FIG. 10B (in practice, the sub-region 1008 need not be extracted from the text region 804). As seen in FIG. 10B, the sub-region 1008 includes the string "5.77" previously encompassed by the group 900, but also includes the characters "$" and "2" which were previously excluded from the group 900. Still further, the sub-region 1008 excludes the characters "png" which were previously included with the character "2" as a single candidate text element due to their proximity with the "2".

Returning to FIG. 3, following the detection of a price text sub-region, at block 330 the interpreter 212 is configured to generate a price text string from the price text sub-region. To generate the price text string, the interpreter 212 is configured to apply a suitable optical character recognition (OCR) technique to the price text sub-region. In the present example, the interpreter 212 is configured to apply a set of operations comprising an OCR pipeline, including a feature extraction step to generate a feature descriptor (e.g. an HOG descriptor), followed by a linear discriminant analysis (LDA), a distance classification operation such as a modified quadrant discriminant function (MQDF) and a comparison of the outputs of the above-mentioned operations with a character database stored in the memory 122. The database may be restricted to only numerical digits and currency symbols in some examples. A variety of other suitable OCR techniques may also be applied, as will now be apparent to those skilled in the art.

It has been found that the generation of text regions and detection of a price text sub-region 1008, as shown in FIG. 10B, may result in increased price text interpretation accuracy, even when conventional OCR techniques are applied by the interpreter 212 at block 330. In contrast, the application of a conventional OCR technique, such as that provided by a first common portable document format (PDF) reader application, to the text region 804 in FIG. 8 fails to identify the price text as a text string, and therefore fails to correctly interpret the price text. The OCR function provided by a second common PDF reader application identifies a portion of the price text, although only at a certain scale. The output of this second application is the string "25 77" which lacks the decimal point and a currency unit and is therefore not a correct actionable price text string. At other scales, the second application, like the first, fails to recognize the price digits as text at all. However, applying both of the above-mentioned conventional OCR techniques to the price text sub-region 1008 in FIG. 10B, at a variety of scales, yields the correct price text string "$25.77".

Testing of the processing techniques described above has, revealed that by performing the method 300, the controller 120 correctly identifies text region locations at a rate of between 93% and 96% at various imaging distances (e.g. distances between the apparatus 103 and the shelves 110), varying between 50 cm and 85 cm. Further, the detection and interpretation of price text from within those text regions was performed correctly for a minimum of 88% of samples (at an imaging distance of 50 cm) and a maximum of 92% (at an imaging distance of 85 cm).

Returning to FIG. 3, following the generation of a price text string at block 330, the control application 128 returns to block 320 to determine whether any price text-classified text regions remain to be processed. When the determination is negative, the performance of the method 300 proceeds to block 335, at which the control application 128 is configured to present the locations of the detected text regions (e.g. regions 600), as well as the price text strings interpreted therefrom. In some examples, the control application 128 is configured to present the text regions and price text strings as an overlay on the image obtained at block 305, for example on a display of the mobile device 105 or another client computing device; the overlaid image can also be stored in the repository 132 instead of, or in addition to, display on the mobile device 105 or other client computing device. In other examples, the control application 128 presents—for display at the mobile device 105, another client device, or both, alone or in combination with presentation to the repository 132 for storage—the text regions and price text strings as a list of bounding box coordinates (e.g. relative to the image obtained at block 305, or relative to a common frame of reference corresponding to the retail environment in which the shelves 110 are located). The list includes, with each bounding box, the corresponding price text string, as well as a label type indicator (where multiple label types were detected by the classifier 204) and a confidence value generated by the interpreter 212 at block 330. An example of such a list is shown below in Table 1.

TABLE 1

Price Text String List

| Bounding Box | Price Text String | Label Type | Confidence |
| --- | --- | --- | --- |
| [X1, Y1] [X2, Y2] | $2.45 | Type-A | 83% |
| [X1, Y1] [X2, Y2] | $12.99 | Type-B | 92% |

Variations to the techniques set out above are contemplated. For example, in the detection of a price text sub-region at block 325, geometric constraints may be applied by the sub-region detector 208 in addition to the size constraint mentioned above. For example, the sub-region detector 208 is configured in some examples to group the candidate text elements by size and only in certain directions, such that candidate text elements are only grouped in a horizontal direction, whether or not similarly-sized elements are present above or below.

In a further example, the sub-region detector 208 is configured to determine whether the difference in size (e.g. area) of two or more candidate primary groups is below a predetermined threshold. When the determination is affirmative, the sub-region detector 208 is configured to apply one or more additional criteria to select the primary group. For example, based on the label type output from the classifier 204, the sub-region detector 208 can be configured to select the primary group candidate closest to an expected price text position (e.g. the center of the label, in the case of the format of the label 416-2).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of price text detection by an imaging controller, comprising:
   obtaining, by the imaging controller, an image of a shelf supporting labels bearing price text;
   generating, by the imaging controller, a plurality of text regions containing candidate text elements from the image;
   assigning, by the imaging controller, a classification to each of the text regions, selected from a price text classification and a non-price text classification for a respective text region, wherein the price text classification includes a non-numeric text element;
   wherein the imaging controller, within each of a subset of the text regions having the price text classification:
      detects a price text sub-region by: (a) assigning the candidate text elements within the text region to groups based on respective sizes of the candidate text elements, and (b) selecting a group having a largest area as a primary one of the groups; and
      generates a price text string by applying character recognition to the price text sub-region; and
   presenting, by the imaging controller, locations of the subset of text regions, in association with the corresponding price text strings.

2. The method of claim 1, further comprising: prior to generating the text regions, identifying the candidate text elements comprises applying a blob detection operation to the image.

3. The method of claim 2, wherein generating the text regions comprises:
   for each pair of the candidate text elements, determining whether a distance between the pair is below a distance threshold.

4. The method of claim 2, wherein generating the text regions comprises:
   for each pair of the candidate text elements, determining whether a difference between a size of each of the pair is below a size threshold.

5. The method of claim 1, wherein assigning the classification to each of the text regions comprises:
   generating a feature descriptor for the text region;
   providing the feature descriptor to a classifier; and
   receiving the classification from the classifier.

6. The method of claim 1, wherein detecting the price text sub-region comprises:
   fitting upper and lower bounding lines to the primary group; and
   extending the primary group along the bounding lines to define the price text sub-region.

7. The method of claim 6, further comprising: prior to assigning the candidate text elements within the text region to groups, binarizing the text region.

8. The method of claim 6, wherein at least one of the upper and lower bounding lines intersects a candidate text element in a group other than the primary group.

9. The method of claim 1, the presenting further comprising presenting a confidence level corresponding to each price text string.

10. A server for detecting price text, comprising:
    a memory storing an image of a shelf supporting labels bearing price text;
    an imaging controller coupled to the memory, the imaging controller comprising:
       a text region generator configured to generate a plurality of text regions containing candidate text elements from the image;
       a classifier configured to assign a classification to each of the text regions, selected from a price text classification and a non-price text classification for a respective text region, wherein the price text classification includes a non-numeric text element;
       a sub-region generator configured to detect a price text sub-region within each of a subset of the text regions having the price text classification by: (a) assigning the candidate text elements within the text region to groups based on respective sizes of the candidate text elements, and (b) selecting a group having a largest area as a primary one of the groups; and
       an interpreter configured to generate a price text string by applying character recognition to the price text sub-region; and to present locations of the subset of text regions, in association with the corresponding price text strings.

11. The server of claim 10, the text region generator further configured, prior to generating the text regions, to identify the candidate text elements by applying a blob detection operation to the image.

12. The server of claim 11, the text region generator configured to generate the text regions by:
    for each pair of the candidate text elements, determining whether a distance between the pair is below a distance threshold.

13. The server of claim 11, the text region generator configured to generate the text regions by:

for each pair of the candidate text elements, determining whether a difference between a size of each of the pair is below a size threshold.

14. The server of claim 10, the classifier configured to assign the classification to each of the text regions by:

generating a feature descriptor for the text region;
providing the feature descriptor to a classifier; and
receiving the classification from the classifier.

15. The server of claim 10, the sub-region generator configured to detect the price text sub-region by:

fitting upper and lower bounding lines to the primary group; and extending the primary group along the bounding lines to define the price text sub-region.

16. The server of claim 15, the sub-region generator further configured, prior to assigning the candidate text elements within the text region to groups, to binarize the text region.

17. The server of claim 15, wherein at least one of the upper and lower bounding lines intersects a candidate text element in a group other than the primary group.

18. The server of claim 10, the interpreter further configured to present a confidence level corresponding to each price text string.

* * * * *